United States Patent [19]

Cronauer et al.

[11] Patent Number: 4,837,688

[45] Date of Patent: Jun. 6, 1989

[54] MULTI-CHANNEL SHARED RESOURCE PROCESSOR

[75] Inventors: Thomas D. Cronauer, Nokesville; Galen P. Plunkett, Burke, both of Va.

[73] Assignee: International Business Machines Corporation, Armonk, N.Y.

[21] Appl. No.: 889,531

[22] Filed: Jul. 25, 1986

[51] Int. Cl.⁴ ............ G06F 13/00

[52] U.S. Cl. ............ 364/200

[58] Field of Search ... 364/200 MS File, 900 MS File

[56] References Cited

U.S. PATENT DOCUMENTS

| | | | |
|---|---|---|---|
| 4,047,161 | 9/1977 | Davis | 364/200 |
| 4,159,518 | 6/1979 | Draper et al. | 364/200 |
| 4,229,790 | 10/1980 | Gillilano et al. | 364/200 |
| 4,286,322 | 8/1981 | Hoffman et al. | 364/200 |
| 4,318,173 | 3/1982 | Freedman et al. | 364/200 |
| 4,430,707 | 2/1984 | Kim | 364/200 |
| 4,475,156 | 10/1984 | Federico | 364/200 |
| 4,642,756 | 2/1987 | Sherrod | 364/200 |
| 4,658,351 | 4/1987 | Teng | 364/200 |

*Primary Examiner*—David L. Clark

*Attorney, Agent, or Firm*—H. Saint Julian; John E. Hoel

[57] ABSTRACT

An external dispatcher distributes prioritize tasks to a plurality of processor channels. The processor channels then contend for one of two partitions for the execution of instructions assigned thereto during a multiphase instruction cycle. Two unique processor channels, working on unrelated tasks, utilize the even and the odd partitions to execute a single instruction assigned to the respective processor channels. The instruction cycle is subdivided into phases in order to maximize the use of a memory system and the central processing unit (CPU). When one of the partitions is accessing the memory system and working registers associated therewith, the other partition is utilizing the CPU. The net result is the efficient use of all memory bandwidth and the CPU without requiring pipe lined set/execute structures common on high performance micro-program systems.

6 Claims, 13 Drawing Sheets

ARITHMETIC FORMAT

IMMEDIATE FORMAT

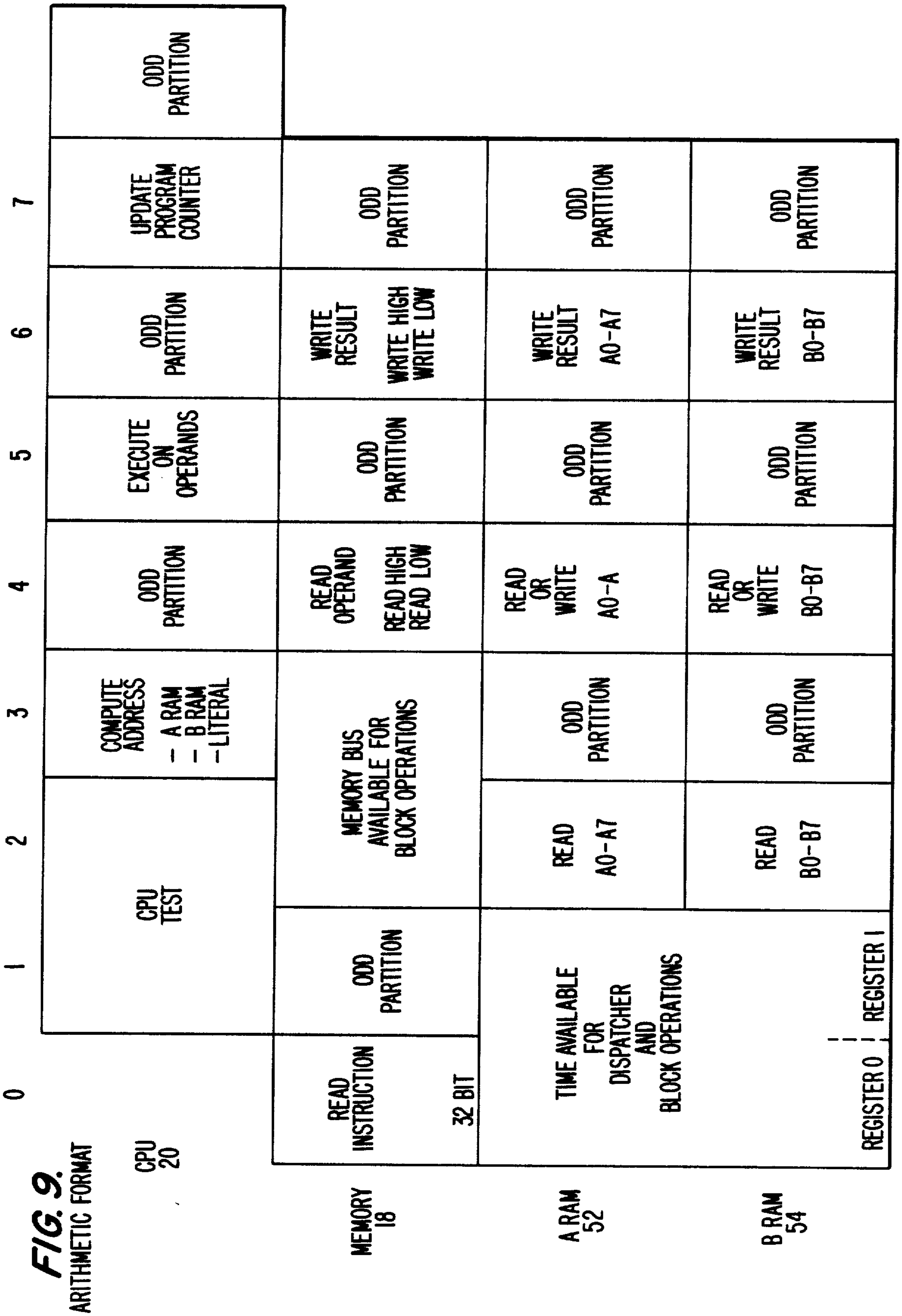

FIG. 9.
ARITHMETIC FORMAT

| | 0 | 1 | 2 | 3 | 4 | 5 | 6 | 7 | |
|---|---|---|---|---|---|---|---|---|---|
| CPU 20 | READ INSTRUCTION 32 BIT | ODD PARTITION | CPU TEST | COMPUTE ADDRESS –A RAM –B RAM –LITERAL | ODD PARTITION | EXECUTE ON OPERANDS | ODD PARTITION | UPDATE PROGRAM COUNTER | ODD PARTITION |
| MEMORY 18 | | TIME AVAILABLE FOR DISPATCHER AND BLOCK OPERATIONS | | MEMORY BUS AVAILABLE FOR BLOCK OPERATIONS | READ OPERAND READ HIGH READ LOW | ODD PARTITION | WRITE RESULT WRITE HIGH WRITE LOW | ODD PARTITION | |
| A RAM 52 | REGISTER 0 REGISTER 1 | | READ A0–A7 | ODD PARTITION | READ OR WRITE A0–A7 | ODD PARTITION | WRITE RESULT A0–A7 | ODD PARTITION | |
| B RAM 54 | | | READ B0–B7 | ODD PARTITION | READ OR WRITE B0–B7 | ODD PARTITION | WRITE RESULT B0–B7 | ODD PARTITION | |

FIG. 12d.
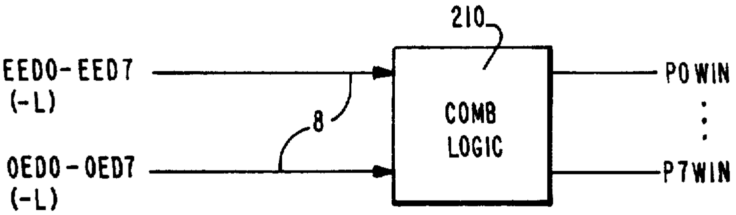
FIG. 12e.
TABLE 1
| P0 STATUS | | | | | | | | NEXT STATE | |
|---|---|---|---|---|---|---|---|---|---|
| S0 | S1 | P0BMC | P0DIS | P0WIN | P0BLK | P0STP | NOP | N0 | N1 |
| 0 | 0 | 1 | 1 | 1 | 1 | 1 | 1 | 0 | 0 |
| 0 | 0 | 1 | 0 | 1 | 1 | 1 | 0 | 1 | 1 |
| 0 | 1 | 1 | 1 | 1 | 1 | 1 | 1 | 1 | 1 |
| 0 | 1 | 1 | 1 | 0 | 1 | 1 | 0 | 0 | 1 |
| 0 | 1 | 1 | 1 | 1 | 0 | 1 | 0 | 1 | 0 |
| 0 | 1 | 1 | 1 | 1 | 1 | 0 | 0 | 0 | 0 |
| 1 | 0 | 1 | 1 | 1 | 1 | 1 | 1 | 1 | 0 |
| 1 | 0 | 0 | 1 | 1 | 1 | 1 | 0 | 1 | 1 |
| 1 | 1 | 1 | 1 | 1 | 1 | 1 | 1 | 1 | 1 |
| 1 | 0 | 1 | 1 | 0 | 1 | 1 | 0 | 1 | 1 |
FIG. 12f.
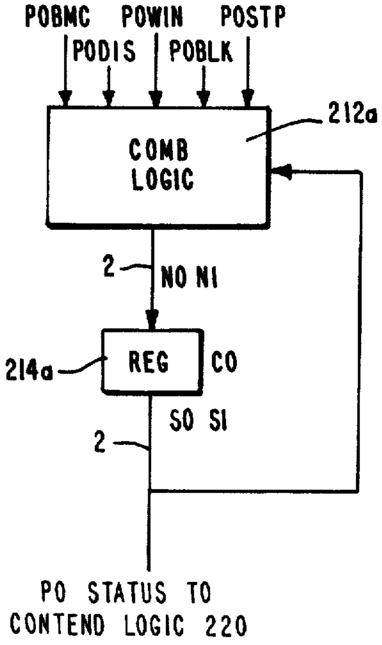

MULTI-CHANNEL SHARED RESOURCE PROCESSOR

BACKGROUND OF THE INVENTION

1. Technical Field

The invention disclosed broadly relates to a computer architecture and more particularly relates to improvements in multi-tasking architectures for data processors.

2. Background Art

Most prior art data processing systems consist of a Central Processing Unit (CPU) which is connected to a writable Random Access Memory (RAM) and to one or more Input/Output (I/O) units be means of a communications path such as an I/O bus. The CPU typically consists of an execution unit which carries out pre-specified elementary computational operations, each of which corresponds to a predetermined machine instruction. The CPU can also handle an I/O communications path interface unit which can coordinate the sequential accessing of machine instruction for the RAM and communications between the execution unit and various I/O units connected to the I/O bus. Typically, the execution unit included an address pointer register who's content contains the address in the RAM of the next machine instruction to be accessed by the bus interface unit. This address will be provided to the execution unit as the location of the next computational step to be carried out by the execution unit. A single instruction stream as defined herein as the provision of a single instruction pointer register for sequentially accessing a unitary logical sequence of instructions to carry out a unitary task.

In the prior art, multi-tasking operations system have been provided for data processing systems having execution units with a single instruction stream. The multi-tasking operation system will allow the storage of two or more separate, unrelated application program machine instruction sequences in the RAM. That first task will be performed under the control of the multi-tasking operation system by sequentially indexing the instruction pointer so that it sequentially addresses logical consecutive machine instructions for carrying out the first task. When the multi-tasking operating systemdetermines that the second applications program stored in the RAM is to be executed, the contents of the instruction pointer register relating to the first task is stored and the contents of any working registers which have been in use during the execution of the first task, are also stored. Then the multi-tasking operation system loads into the address pointer register the address of the first instruction in the RAM corresponding to the second to be executed and restarts the execution unit. The execution unit then proceeds to sequentially execute the logically connected sequence of machine instructions corresponding to the second task to be executed.

It can be seen that in order to transfer the execution of a single instruction stream of the execution unit from carrying out the first applications program to carrying out the second application program, a sequence of transitional steps must take place to store the current state of execution of the first program. In those multi-tasking applications where the transition from the first applications program to a second applications program must take place in a short period of time, the transitional steps for carrying out that transition impose a limit on the rapidity with which the transfer control can take place.

OBJECTS OF THE INVENTION

It is therefore an object of the invention to provide an improved means for carrying out multi-tasking data processing operations.

It is another object of the invention to provide an improved means for rapidly making the transition between the execution of a first task and the execution of a second task in a multi-tasking environment.

It is yet another object of the invention to provide an improved means for rapidly making the transition between the execution of a first task and the execution of a second task in a multi-tasking environment.

It is yet another object of the invention to provide a simplified technique for transferring between a first and a second applications program in a multi-tasking environment.

It is still another object of the invention to provide a technique where by a plurality of processor channels constantly contend for two participations in order to execute task assigned thereto.

DISCLOSURE OF THE INVENTION

These and other objects, features and advantages of the invention are accomplished by a multi-channel shared resource processor disclosed herein. An execution unit facilitates multi-tasking by providing a plurality of instruction streams with each instruction stream utilizing a dedicated set of working registers. A cache memory, which is associated with the execution unit, has a plurality of eight memory partitions each of the memories being allocated to one of the instructions streams. Additionally, there is a program counter associated with each of the respective eight instruction streams.

An external dispatcher distributes tasks having different priorities to the eight instructions streams. The execution unit switches between the instruction streams in order to service the tasks having the highest priorities. The execution unit has a multiphase instruction cycle associated therewith which is partitioned into eight phases and allows two (2) concurrent tasks to share the multiphase instruction cycle. The multiphase instruction cycle is evenly divided into an even partition and an odd partition. The instruction streams then contend for the even partition or the odd partition in order to execute the task assigned to the respective instruction stream.

During the execution of a first partition, for example on the even partition, the execution unit sequentially executes instructions associated with that instruction stream. If a second task is thereafter assigned to an instruction stream by the dispatcher, having a higher priority, the execution unit transfers control to the high priority task at the beginning of the next instruction cycle by suspending the execution of the first task and allowing the contents of the program counter and the working registers associated with the first task to remain intact. Control is then transferred to the second processing stream, its second program counter and its working registers. In this manner, no time is wasted in storing the contents of the program counter and the working registers associated with the first task in order to transfer control to execute the second task. The contents of a flag register, program counter and working registers associated with the first task are merely held in place while the execution unit executes the second task.

BRIEF DESCRIPTION OF THE DRAWINGS

The foregoing and other advantages of the invention will be more fully understood with reference to the description of the best mode and the drawing wherein:

FIG. 9 illustrates a hardware utilization schedule across the multiphase cycle for the multi-channel shared resource processor.

FIGS. 12*a* through 12*f* are schematic diagrams of a channel status circuit.

DESCRIPTION OF THE BEST MODE FOR CARRYING OUT THE INVENTION

Figure 1:
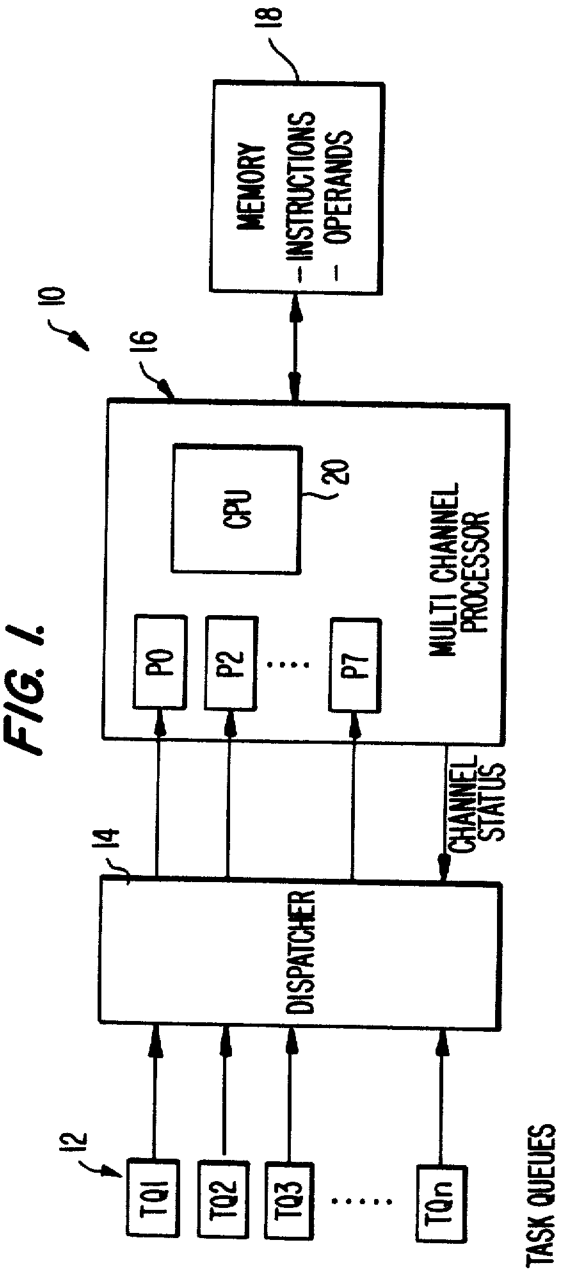
FIG. 1 illustrates a conceptual block diagram of an data processor system in accordance with the invention.

Referring FIG. 1, a data processor system 10 described herein includes a plurality of task queues 12, a dispatcher system 14, an execution unit such as a multi-channel shared resource processor (MSRP) 16 and memory system 18. The MSRP 16 includes eight distinct processor channels P0 through P7, which utilize the memory system 18 and a central processing unit (CPU) 20. The dispatcher 14 distributes tasks appearing in task queues 12 having different priorities to the processor channels P0 through P7. The MSRP 16 switches between the processing channels during an instruction cycle in order to service the tasks having the highest priorities. The MSRP 16 further includes eight program counters which are associated with the eight processor channels P0 through P7. Each of the processor channels uses its respective program counter to maintain an instruction stream. This architecture eliminates the need to interrupt an instruction stream in a single processor channel working on a first task for a context switch to a second task. The instruction cycle starts by reading an encoded instruction from the memory system 18, executing the instruction and ends by storing information in the processor channel's exclusive section of the memory system 18 and the processor channel's exclusive working registers in the CPU 20. Thus, each instruction cycle ends without storing any residual information in the CPU 20 resources that are shared amoung the eight processor channels P0 through P7 which then facilitates an instantaneous change to another processor channel's instruction stream.

Figure 2:
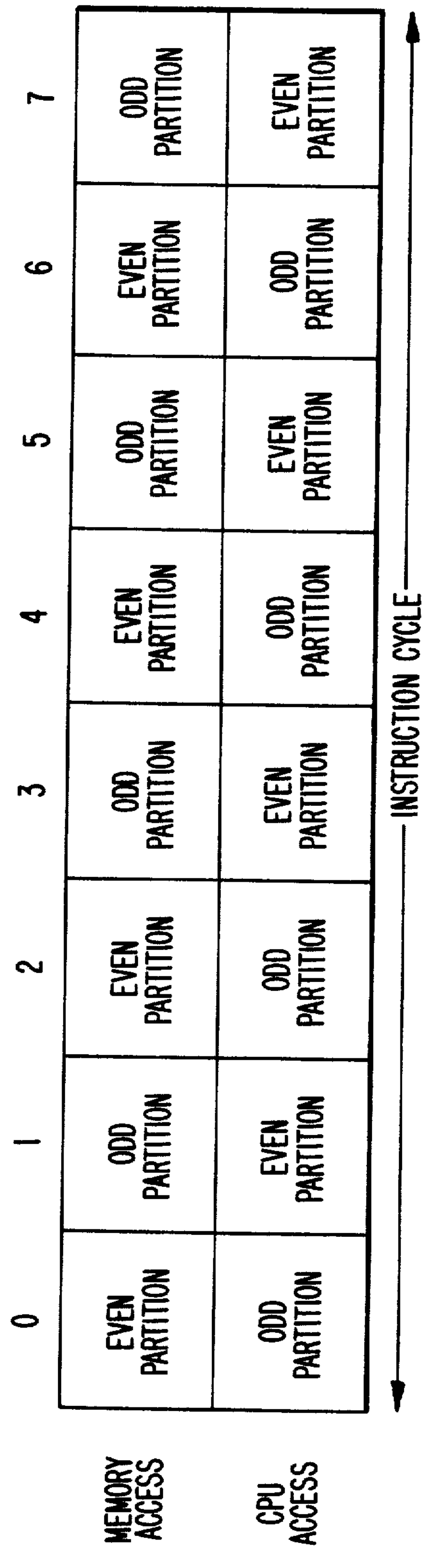
FIG. 2 illustrates a multiphase instruction cycle in accordance with the invention.

In order to fully utilize the CPU 20, the MSRP 16 facilitates the concurrent execution of two instructions from two different processor channels with the highest priorities. The instruction cycle of the MSRP 16 is partitioned into a multiphase cycle having eight phases. As noted above, the MSRP 16 is designed to allow two processor channels to share this multiphase cycle so that each processor channel can execute and entire instruction. The multiphase cycle is evenly divided into an even partition and an odd partition. Any of the eight processor channels P0 through P7 maybe assigned to either the even partition or the odd partition. The even partition and the odd partition share the memory system 18 and the CPU 20 during the multiphase cycle as shown in FIG. 2. The MSRP 16 is designed so that all memory operations are exclusive of the CPU operations. Concurrent instruction execution in the multiphase cycle effectively doubles the MSRP 16 throughout and enables the efficient use of the memory system 18 and the CPU 20.

Figure 3:
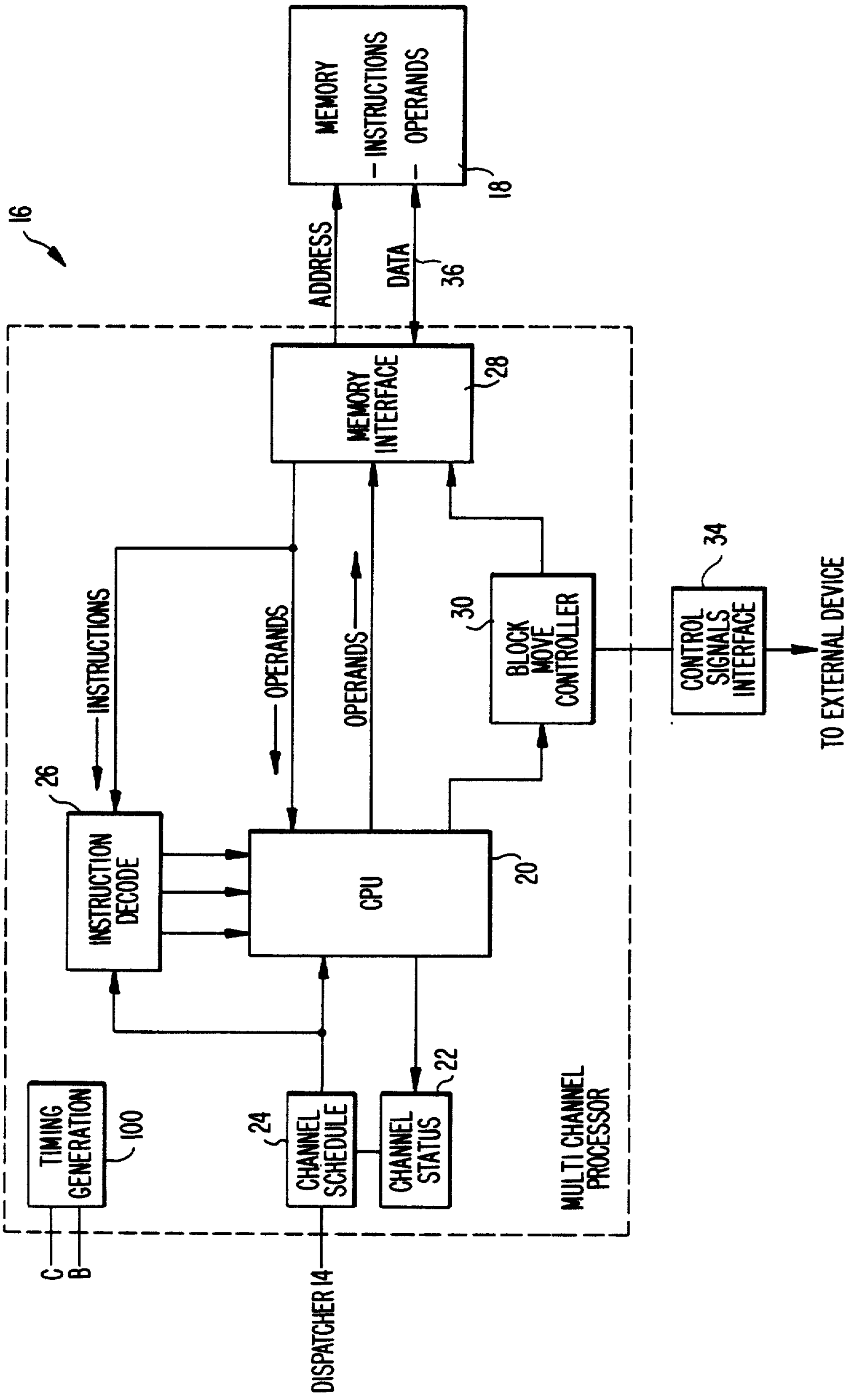
FIG. 3 illustrates a functional block diagram of a multi-channel shared resource processor in accordance with the invention.

Referring to FIG. 3, there is shown a detailed block diagram of the MSRP 16. The memory system 18 serves as the micro instruction store and a working store or cache memory for the processor channels P0 through P7. The micro instruction store occupies the front section of the memory system 18 and is shared by the eight processor channels. The last section of the memory system 18 is used for processor channel working store. Operands stored in the cache memory section of the memory system 18 are 16 bits wide in order to be compatible with the data flow associated with the processor channels P0 through P7. Each of the processor channels P0 through P7 is restricted to its own section of cache memory.

Each of the processor channels P0 through P7 operates in one of the four following states:

EXECUTING, the processor channel is currently executing on the even partition or on the odd partition.

FINISHED, the processor channel is available for work.

NOT EXECUTING, the processor channel is executing a program and currently contending for a partition.

BLOCK, the processor channel is waiting on a block transfer.

A channel status circuit 22 monitors the processor channels P0 through P7 and determines which state the processor channels are operating. There are six mutually exclusive events which move the processor channels P0 through P7 from one state to another state. The list below is in reference to processor channel P0.

Figure 4:
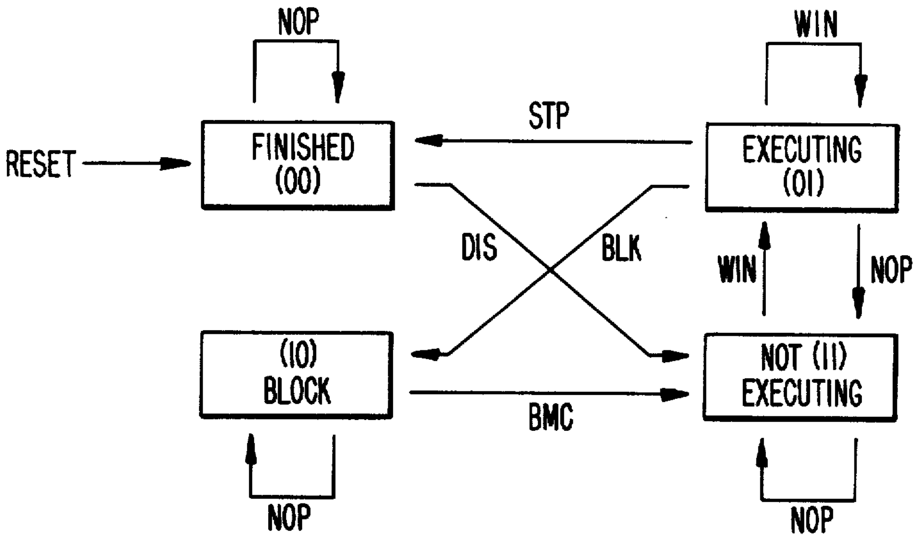
FIG. 4 illustrates a state diagram of the operation of the invention.

NOP—No event occurred on channel P0
DIS—Channel P0 is dispatched
BLK—Channel P0 executes a block instruction
BMC—Channel P0 completes a block move
WIN—Channel P0 wins a partition
STP—Channel P0 executes a stop instruction Each of the processing channels P0 through P7 has the potential to change state at the end of every instruction cycle. A state diagram showing how these mutually exclusive events change a processor channel's state is shown in FIG. 4. All eight of the processor channels P0 through P7 are forced into the FINISHED state upon reset.

Referring again to FIG. 3, a channel schedule circuit 24 receives task priorities from the dispatcher system 14

(FIG. 1) and processor channel status information from the channel status circuit 22 in order to schedule the MSRP 16 to expedite the tasks having the highest priority. The processor channels P0 through P7 in the appropriate state contend during instruction N for the even and the odd partitions for instruction cycle N+1. The channel schedule circuit 24 also supplies two three-bit processor channel selection signals to the other circuits of the MSRP 16 which indicates which processor channel is running on the even and the odd partitions.

An instruction decode circuit 26 interprets two thirty-two bit instructions during each instruction cycle. Instructions associated with the even and the odd partitions are fetched from memory system 18 during phases 0 and 1, respectively, of the instruction cycle. The instructions are separately latched into respective registers and remain stable throughout the remainder of the instruction cycle. The instruction decode circuit 26 then alternately transmits information to the CPU 20 regarding these two instructions in order to generate appropriate CPU control signals. The control signals effectively facilitate the execution of the two unique interleaved instructions which are in phase with their respective operands.

A memory interface circuit 28 facilitates the reading from, writing to and addressing of the memory system 18. As noted above, the memory system 18 also serves as a micro-instruction store and a processor channel exclusive working store or cache memory. The memory interface circuit 28 controls the direction of the flow of data and the addressing of the memory system 18 as the function of the multiphase instruction cycle of the two instructions operating on the even and the odd partitions. Referring again to FIG. 2, the activity of the memory interface circuit 28 is defined for one instruction cycle. During phases 0 and 1, the even and the odd partitions, respectively, are allowed to read an instruction from the memory system 18. Phases 2 and 3 are set aside for block transfer of data by the block move controller 30 (FIG. 3). During phases 4 through 7 the activity of the memory interface circuit 28 is governed alternately by instruction streams operating on the even and the odd partitions.

Referring to FIG. 3, the block move controller of 30, in response to a request from the two instruction streams operating on the even and the odd partitions, communicates with an external device (not shown) through control interface 34. The external device has the capability to address, read and write to the cache memory section of the memory system 18 which is associated with the respective processor channels P0 through P7. The external device is used to move blocks of data between the cache memory section of the memory section 18 and a much larger global memory (not shown). Block move parameters are stored in respective processor channel exclusive working registers prior to the selected processors channels release of a partition. The external device can read, write and address the memory system 18 only during phases 2 and 3 of the instruction cycle.

When the external device indicates that it is ready to transfer data and at least one processor channel is waiting in a BLOCK state, the block move controller 30 samples the output of the channel schedule circuit 24 in order to determine which of the processor channels in the BLOCK state has the highest priority. The block move controller 30 then extracts from the processor channel's working registers the block move parameters which the selected processor channel stored prior to entering the BLOCK state. The block move parameters specify direction of the block move, the number of words and the starting address for both its associated section of cache memory and the global memory. The block move parameters are transmitted across the memory data bus 36 to the external device during phases 2 and 3 of the instruction cycle. The block move controller 30 then facilitates placing the memory data bus 36 in a high impedance state during phases 2 and 3 of the instruction cycle while the transfer of data into or out of the processor channel's associated section of the cache memory. Upon receiving a "block move complete (BMC)" signal over the control interface 34, the block move controller 30 informs the channel status circuit 24 to move the processor channel from the BLOCK state to the NOT EXECUTING state by facilitating the generation of the block move complete (BMC) event for the processor channel which has completed the block transfer. The processor channel then contends for the even or the odd partition on order to complete its instruction cycle.

Central Processing Unit 20

Figure 6:
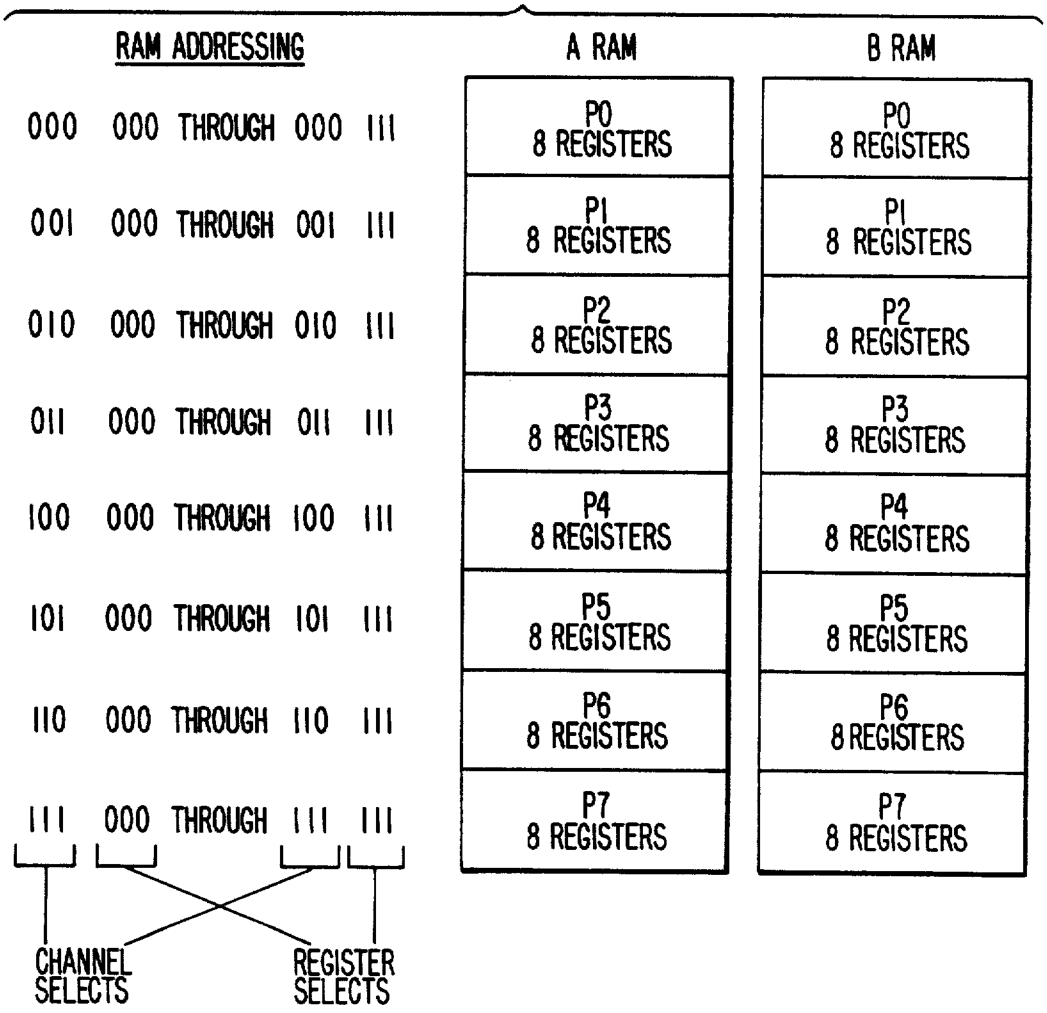
FIG. 6 illustrates the organization of the working registers for the CPU.
Figure 5:
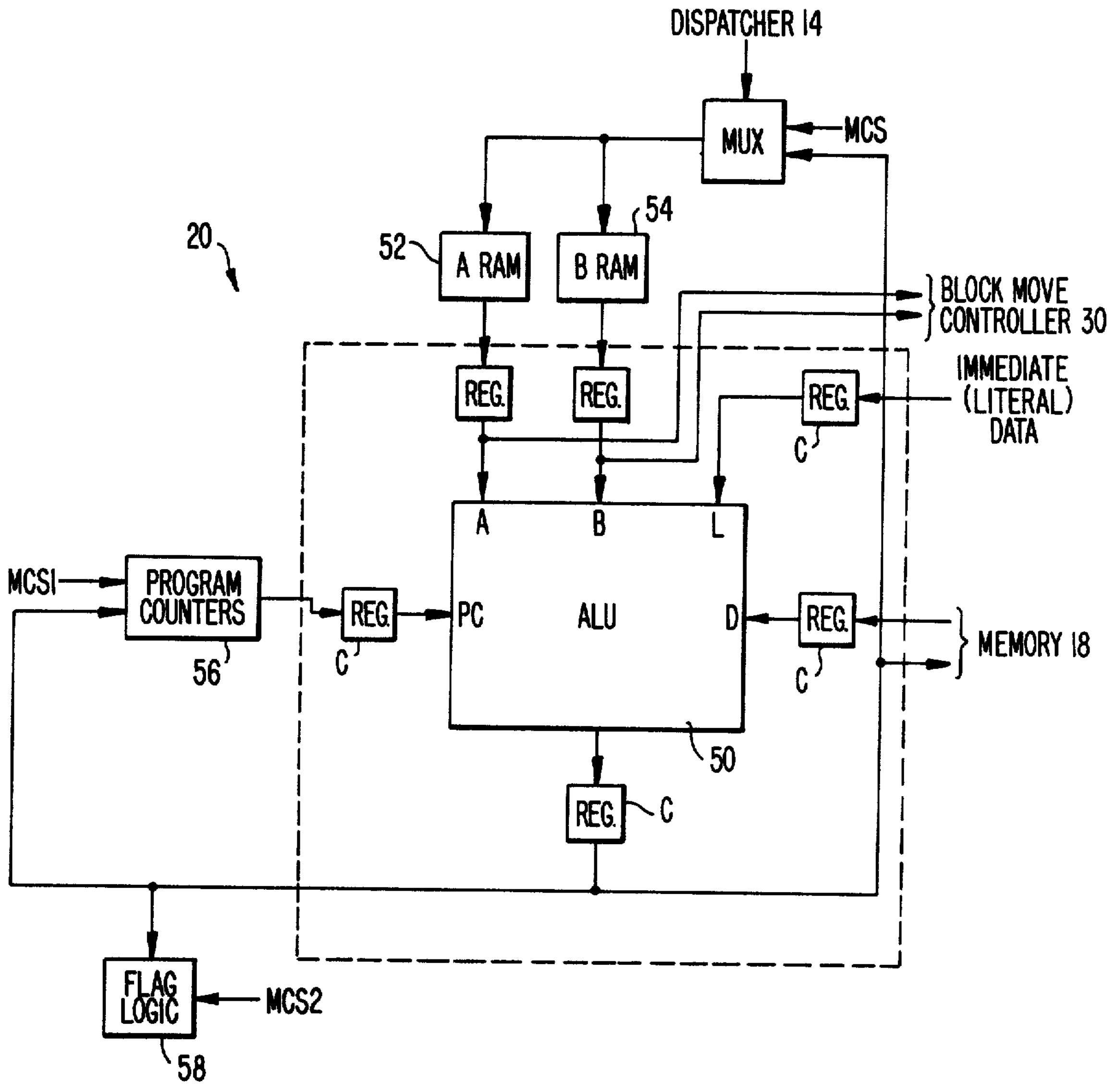
FIG. 5 illustrates a functional block diagram of a CPU associated with the multi-channel shared resource processor in accordance with the invention.

Referring to FIG. 5, the CPU 20 includes circuit elements which are used by all eight of the the processor channels P0 through P7 and circuit elements which are unique to each of the processor channels. A phantom box surrounds the circuit elements which are shared by all eight processor channels P0 through P7. An arithmetic logic unit (ALU) 50 includes a combinatorial network (not shown) which performs micro program controlled operations between five 16-bit ports, A, B, L, D, and PC. Circuit elements outside of the phantom box, such as a pair of random access memory (RAM) circuits 52 and 54, a plurality of program counters 56 and a plurality of flag logic circuits 58, are segmented or replicated 8 times in order to make the eight processor channels P0 through P7 mutually exclusive. RAM circuits 52 and 54 are partitioned as working registers for the respective processor channels P0 through P7 as are shown in FIG. 6. In addressing the RAM circuits 52 and 54, a composite address is composed of the 3-bit channel select signals generated by the channel schedule circuit 24 and register select bits from unique 3-bit fields in the micro-instructions.

Instruction Format

Figure 7:
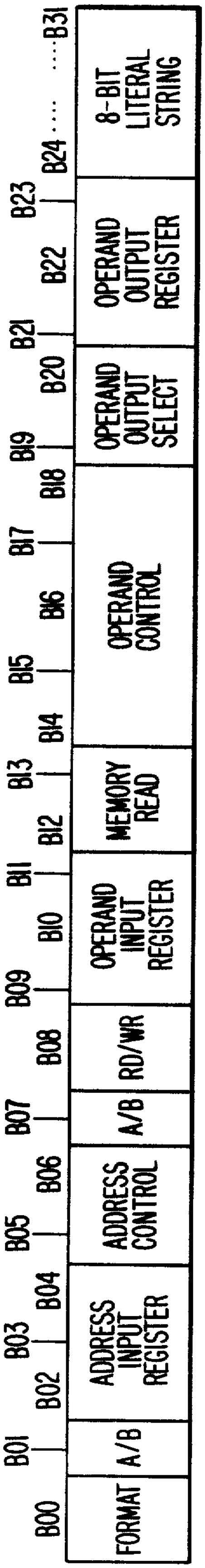
FIGS. 7 and 8 illustrate the instruction format used to program the multi-channel shared resource processor.
Figure 8:
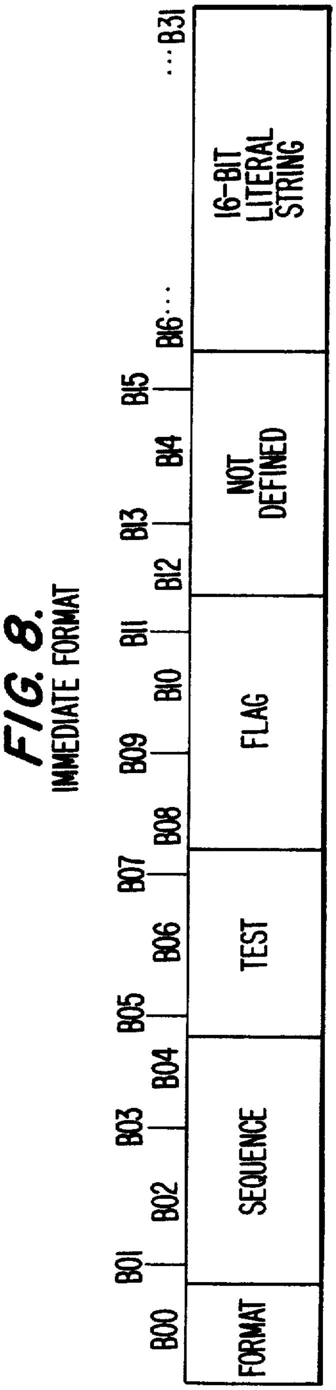

Referring to FIGS. 7 and 8, two 32-bit instruction formats are used to program the MSRP 16. Instructions in a arithmetic format indicates that the selected one of the program counter 56 will proceed to the next sequential instruction. The first 24 bits of the the instruction in the arithmetic format are used to establish control throughout the eight phases of the instruction cycle. The remaining 8 bits are used as a literal string for operand addressing and for arithmetic operations. A detail phase map setting forth the activities of the CPU 20, the memory system 18, and the working registers of RAM circuits 52 and 54 for the even partition is shown in FIG. 9.

Instructions in an immediate format indicate that the selected one of the program counters 56 may not proceed to the next sequential instruction. The first 12 bits of an instruction in the immediate format set forth the type of operation to be performed such as a branch, call, loop, stop or block transfer, the test flag to be used when a conditional operation is to be performed and which of the flag registers included in the flag logic 38 is to be set or cleared. The last 16 bits of an instruction in the immediate format are used as a literal string for micro-store addressing.

Timing Generation Circuit 100

Figure 10:
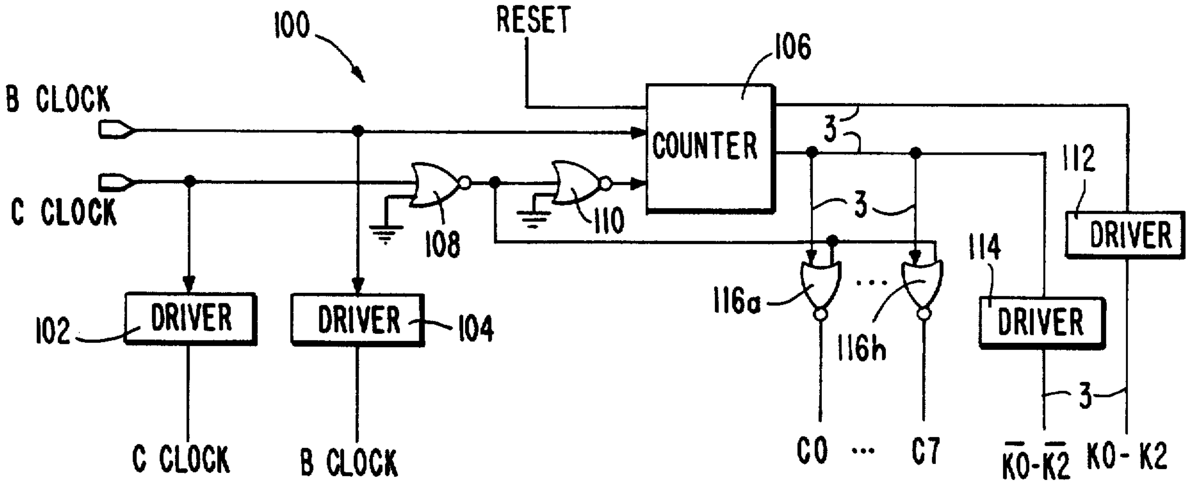
FIG. 10 shows a schematic diagram of the timing generation circuit.
Figure 11:
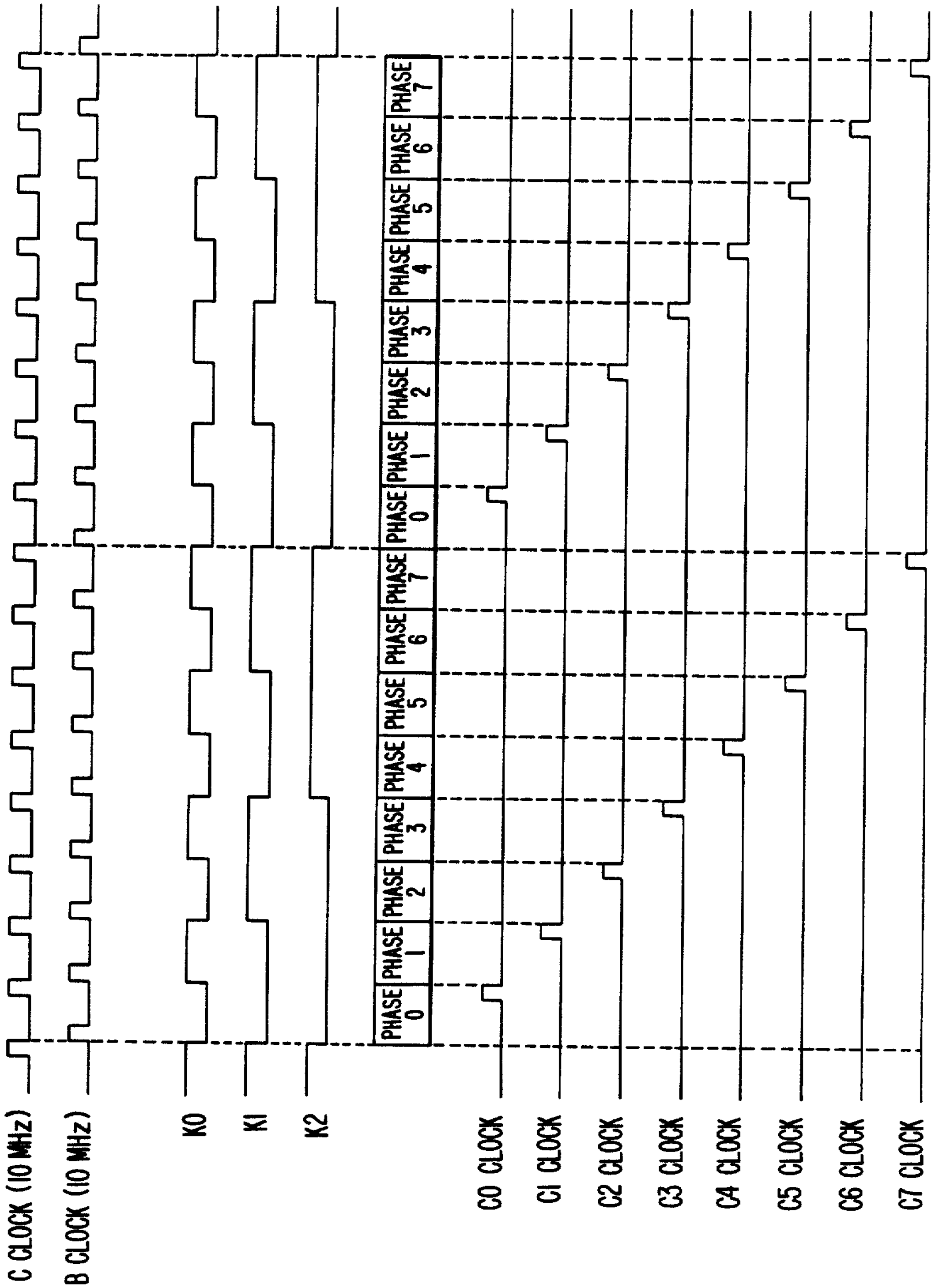
FIG. 11 shows timing diagrams associated with the the multi-channel shared resource processor.

Referring to FIG. 10, a timing generation circuit 100 generates a plurality of phase signals, K0 through K2, and a plurality of gated clock signals C0 through C7 which are used throughout the MSRP 16 to implement the multiphase instruction depicted in FIG. 9. System clock signals B and C are fed to (1) drive circuits 102 and 104, respectively. The B system clock is also fed to a counter 106. The C system clock is fed through NOR gate 108 and 110 to the counter 106. A 3-bit output from the counter 106 is fed to a driver circuit 112 as the phase signals K0, K1 and K2. The phase signsl K0, K1 and K2 define the multiphase instruction cycle as shown in FIG. 11. The complement of the output of counter 106 is fed through a driver circuit 114 as phase signals K0 prime K1 prime and K2 prime and to inputs of a plurality of NOR gates 116A through 116G. The C system clock enables NOR gates 116A through 116G to generate a plurality of gated clocks C0 to C7 as shown in FIG. 11.

Channel Status Circuit 22

Referring to FIGS. 12*a* through 12*f*, the channel status circuit 22 monitors the channel schedule 24 in order to determine which state the processor channels P0 through P7 are operating. As noted above the four states are FINISHED, EXECUTING, BLOCK and NOT EXECUTING. In order to move a processor channel from one state to another state, one of the following six (6) mutually exclusive events must occur: the processor channel must be dispatched (DIS), the processor channel execute a block instruction (BLK), the processor channel completes a block move (BMC), the processor channel wins a partition (WIN), the processor channel executes a stop instruction (STP) or no event occurs on the processor channel (NOP) as shown in FIG. 4.

Figure 12A:
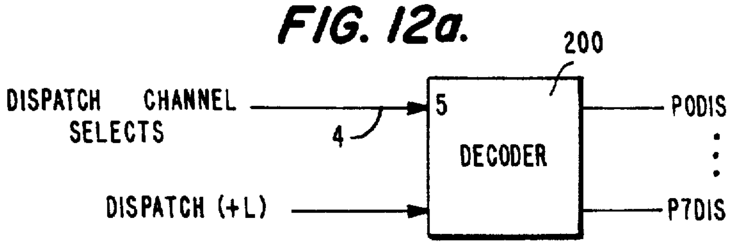
Figure 12B:
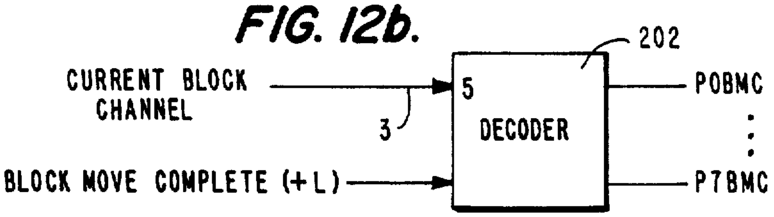
Figure 12C:
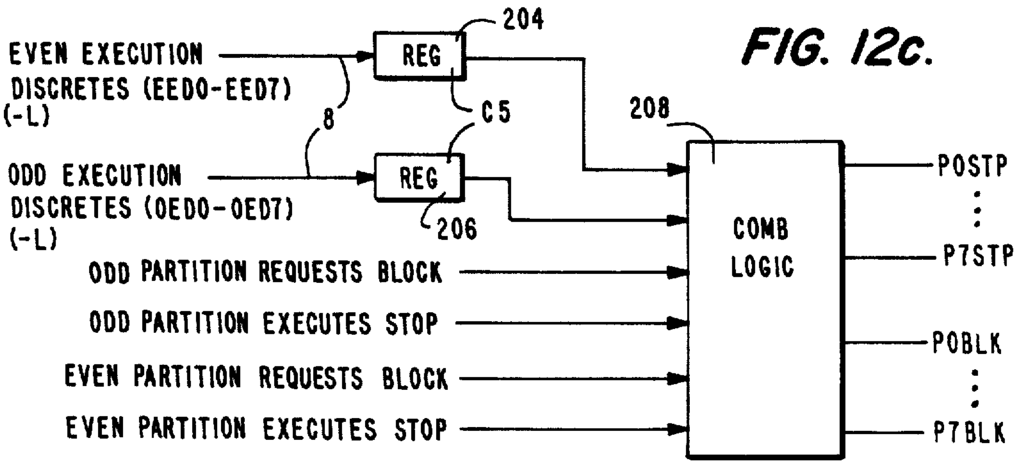

As noted above, the dispatcher 14 (FIG. 1) which distributes tasks to the eight processor channels P0 through P7 transmits a 3-bit binary code indicating the processor channel receiving the task assignment along with a dispatch (enable) signal to a decoder 200 (FIG. 12*a*). The decoder 200, in response to the dispatcher 14, generates a low level signal on one of its eight outputs which corresponds to the processor channel selected by the dispatcher. The block move controller 30 also transmits the BMC signal to a decoder 202 (FIG. 12*b*) along with a 3-bit binary code indicating the processor channel which is currently being serviced by the block move controller 30. The decoder 202 generates a low level signal on one of its eight outputs indicating the processor channel P0 through P7 which has completed the block transfer of data.

The channel status circuit 22 also receives one-of-eight active low discrete signals from the channel schedule circuit (FIG. 3) which indicate which of the processor channels P0 through P7 are currently operating on the even and the odd partitions. The discrete signals representing the even and the odd partitions are stored in registers 204 and 206 (FIG. 12*c*), respectively. Moreover, instruction decode circuit 26 (FIG. 3) transmits to the channel status circuit 22 signals which indicate which partition is requesting a block transfer and which partition is executing a stop instruction. The even execution and the odd execution discrete signals and the signals generated by the instruction decode circuit 26 are fed to a logic circuit 208 (FIG. 12*c*) which includes NOR gates which facilitates the generation of the appropriate signals indicating that a selected processor channel on the even or the odd partition has executed a stop instruction or a selected channel on the even or the odd partition requested a block transfer. All of the output signals associated with the logic circuit 208 are active low signals.

As noted above, the processor channels P0 through P7 may be operating on the even partition or the odd partition. Thus, in order to generate an output, for example output POSTP, the logic circuit 208 must satisfy the conditions wherein processor channel P0 is operating on the even partition or the odd partition. If processor channel P0 is operating on the even partition, only bit zero of register 204 will be in a low state. A NOR function is then performed with bit zero (EED0) of register 204 and the "even partition executes a stop" signal generated by the instruction decode register 26. Processor channel P0 may alternately by operating on the odd partition. A NOR function is then performed in the logic circuit 208 with bit zero (OED0) of register 206 and the "odd partition executes a stop" signal generated by the instruction decode circuit 26. The outputs of these two OR functions are fed to inputs of an NOR gate. The output of the NOR gate will be "P0STP". Similar circuits are included in logic circuit 208 for outputs P1STP through P7STP. Outputs P0BLK through P7BLK are generated using similar circuits, however, an OR function is performed having the odd partition request a block signal, the even partition request a block signal and the appropriate bits from registers 204 and 206, respectively.

The even execution and the odd execution discrete signals are fed to a logic circuit 210 (FIG. 12*d*). in order to generate a WIN signal for the respective processor channels P0 through P7. Logic circuit 210 includes a plurality of equivalence gates satisfying the boolean expression AB+A'B' therein. Thus, the even and the odd execution discretes which pertain to processor channel P0 are fed to inputs of an equivalence gate which then generates a low active signal if processor channel P0 is presently operating on the even or the odd partition. Similar circuits are included in logic circuit 210 for processor channels P1 through P7.

The channel status circuit 22 also includes a plurality of state logic circuits 212 (FIG. 12*f*) (one shown) which are associated with the processor channels P0 through P7. The state logic circuits 212 generate the next state signals S0, S1 for the respective processor channels P0 through P7. All of the state logic circuits 212 are schematically similar, thus, for purposes of illustration, only the state logic diagram 212*a* which is associated with processor channel P0 will be explained in detail. As noted above, the processor channel P0 through P7 may be operating in any one of four states. The four states and their binary designation are: FINISHED (00), EXECUTING (01), BLOCK (10) and NOT EXECUTING (11). Referring to FIG. 12*e*, a truth table which sets forth the current state or status signal (S0, S1) of processor channel P0 and generated by the state logic circuit 212*a*, the mutually exclusive events related thereto which are generated by decoder 200 and 202, logic circuits 208 and 210, and the next state signals (N0, N1) generated by the state logic circuit 212*a*. Referring also to FIG. 4, let us assume that processor channel P0 is in the FINISHED (00) state. If decoder 200 generates a low signal on its P0DIS output line, processor channel P0 is dispatched and changes to the NOT EXECUTING (11) state. In order for processor channel P0 to move to the EXECUTING (01) state it must contend for and win the even partition or the odd partition. Once in the EXECUTING state, processor channel P0 may move to the BLOCK (10) state if the instruction which is being executed thereon request a block transfer. Processor channel P0 then stores block move parameters in its working registers prior to entering the block state. These parameters include the direction of the block transfer, the number of words to be transferred, and the starting address thereof. The logic circuit 208 thereafter generates a signal indicating that processor channel P0 has executed a block instruction. This signal is fed to the state logic circuit 212A which facilitates the change of state of the processor channel P0 to the BLOCK (10) state. The block move controller 30 samples the output of a channel schedule circuit 24 to determine which of the processing channels in the BLOCK state has the highest priority. The block move controller 30 then extracts the parameters from the selected processor channels cache memory and transmits them over memory data bus 36 to the external device. The memory data bus 36 is then placed in a high impedance state until the "block move complete (BMC)" signal is detected which indicates that the block transfer has been completed. Decoder 202 then transmits a signal to the state logic circuit 212A which facilitates changing the status of processor channel P0 to the NOT EXECUTING (11) state. Processor channel P0 will begin to recontend for the even partition or the odd partition in order to move back to the EXECUTING (01) state. Processor channel P0 eventually executes a STOP instruction and moves to the FINISHED (00) state.

As noted above, the dispatch signal (P0DIS), the block move complete signal (P0BMC), the stop signal (P0STP), the block request (P0BLK) and the win partition signal (P0WIN) are fed to state logic circuit 212A in order to generate the current state signals (S0, S1) and the next state (N0, N1) of the processor channel P0. The next state signals (N0, N1) are loaded into register 214*a* under the control of the gated clock C0 and becomes the current state signals (S0, S1) of the processor channel P0. The current state signals (S0, S1) are then fed to a contend logic circuit 220 (FIG. 13) which determines whether the processor channel P0 will contend for the even partition, the odd partition, or for service by the block move controller 30 during the next instruction cycle.

Contend Logic Circuit 220

Figure 13:
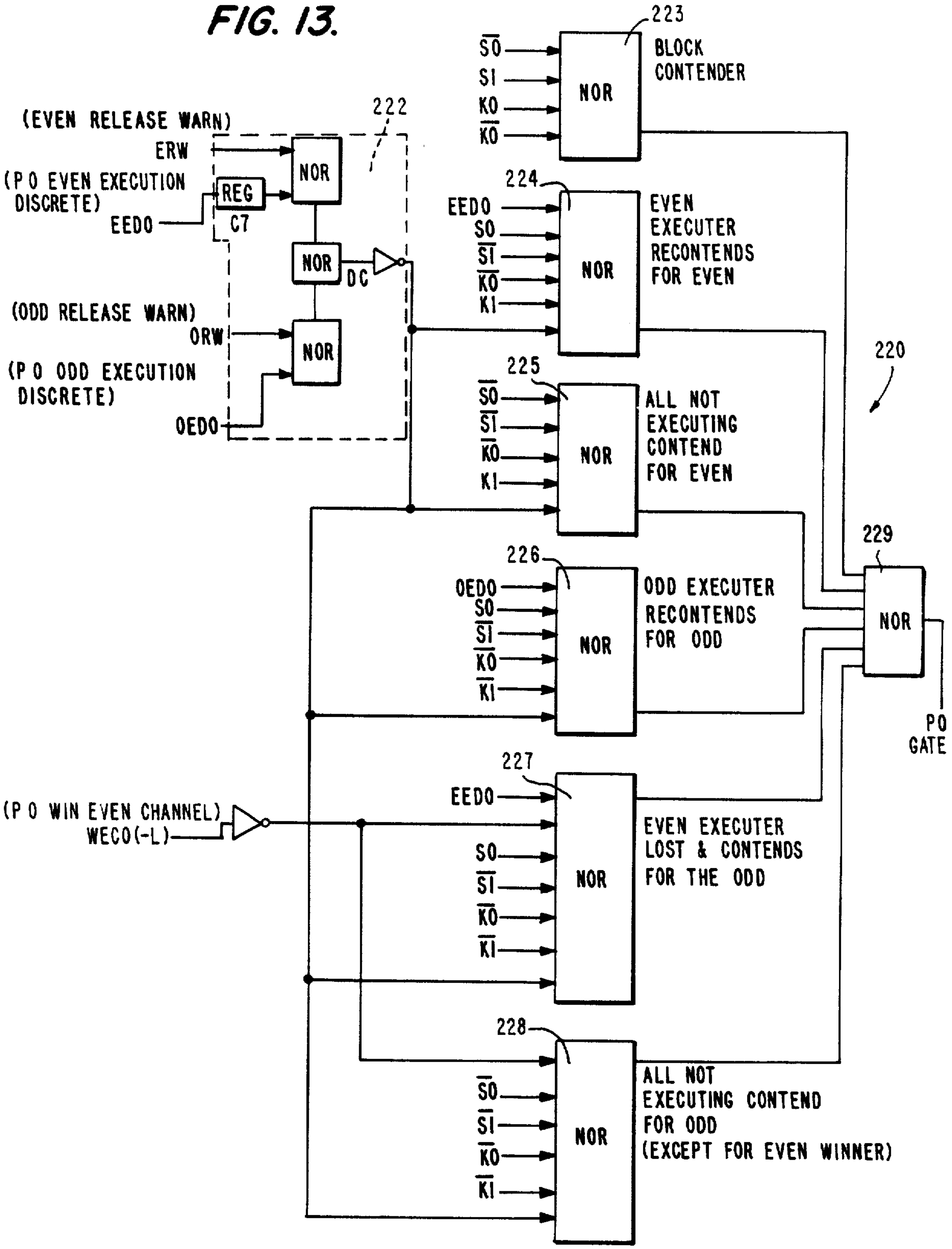
FIG. 13 shows a schematic diagram of a contend logic circuit.
Figure 14A:
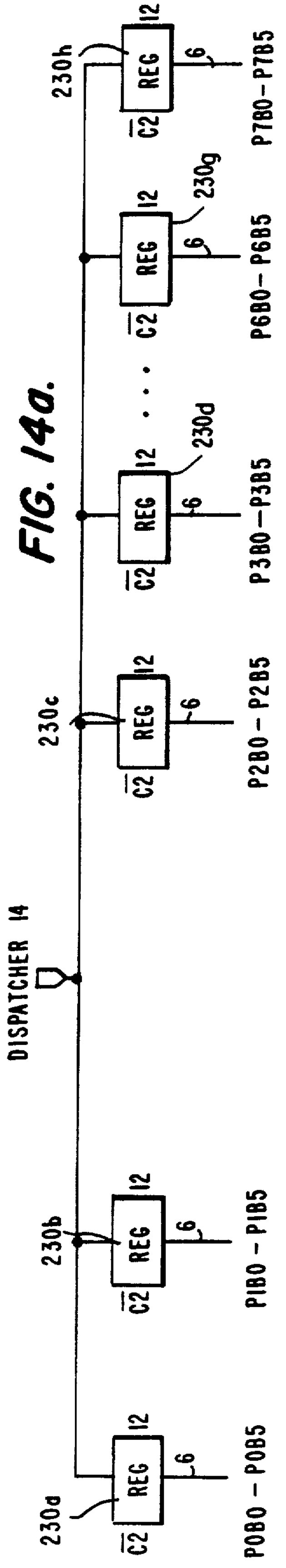
FIGS. 14*a* through 14*d* show schematic diagrams of the channel schedule unit in accordance with the invention.
Figure 14D:
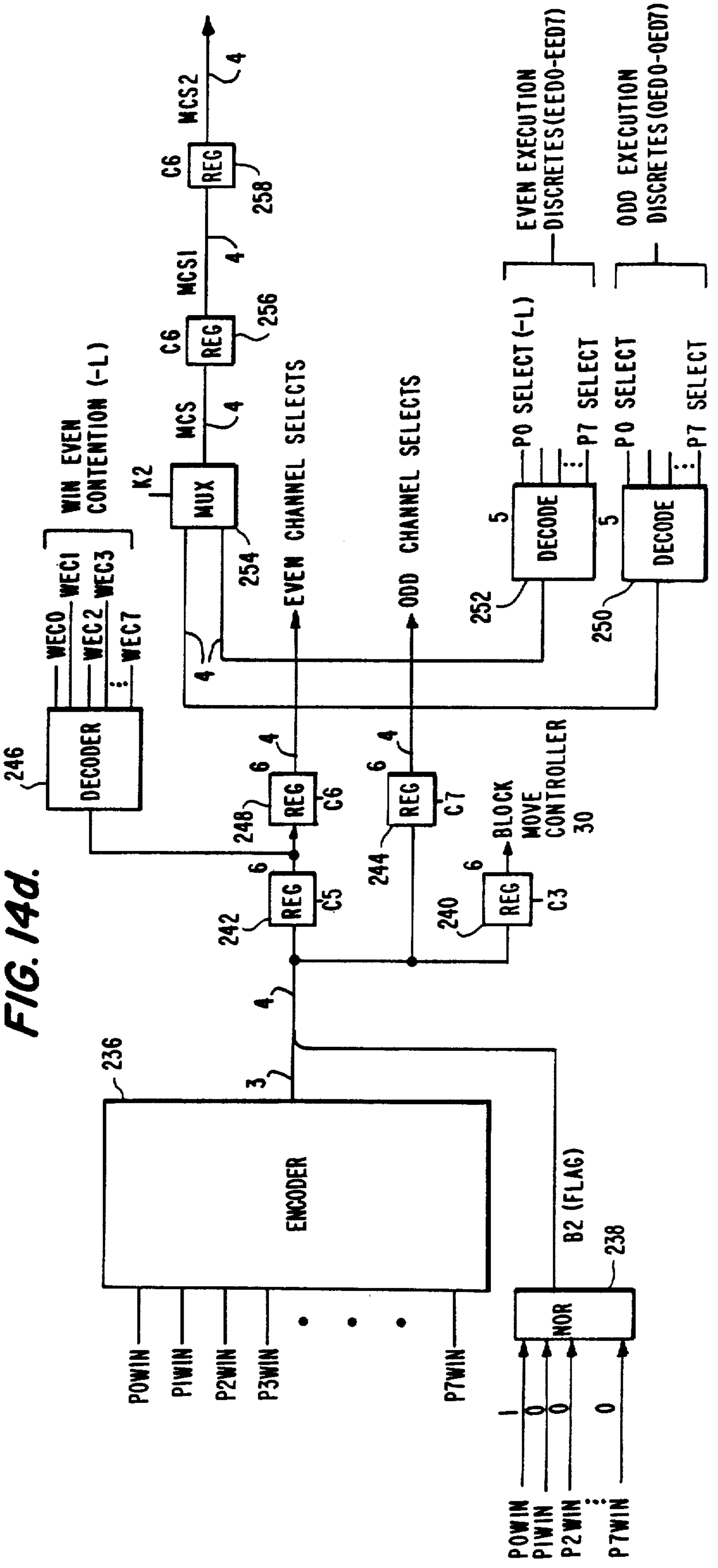
Figure 14B:
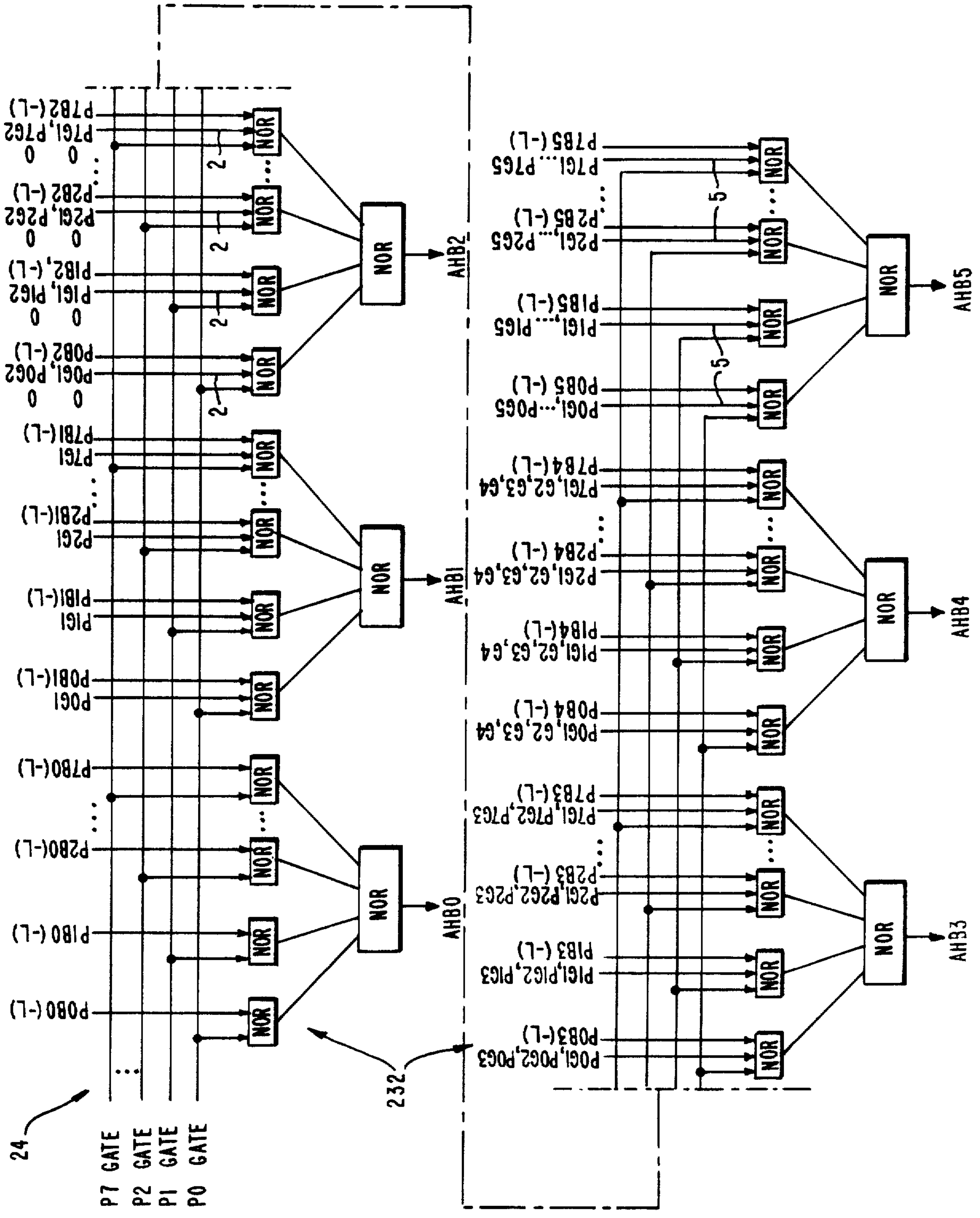
Figure 14C:
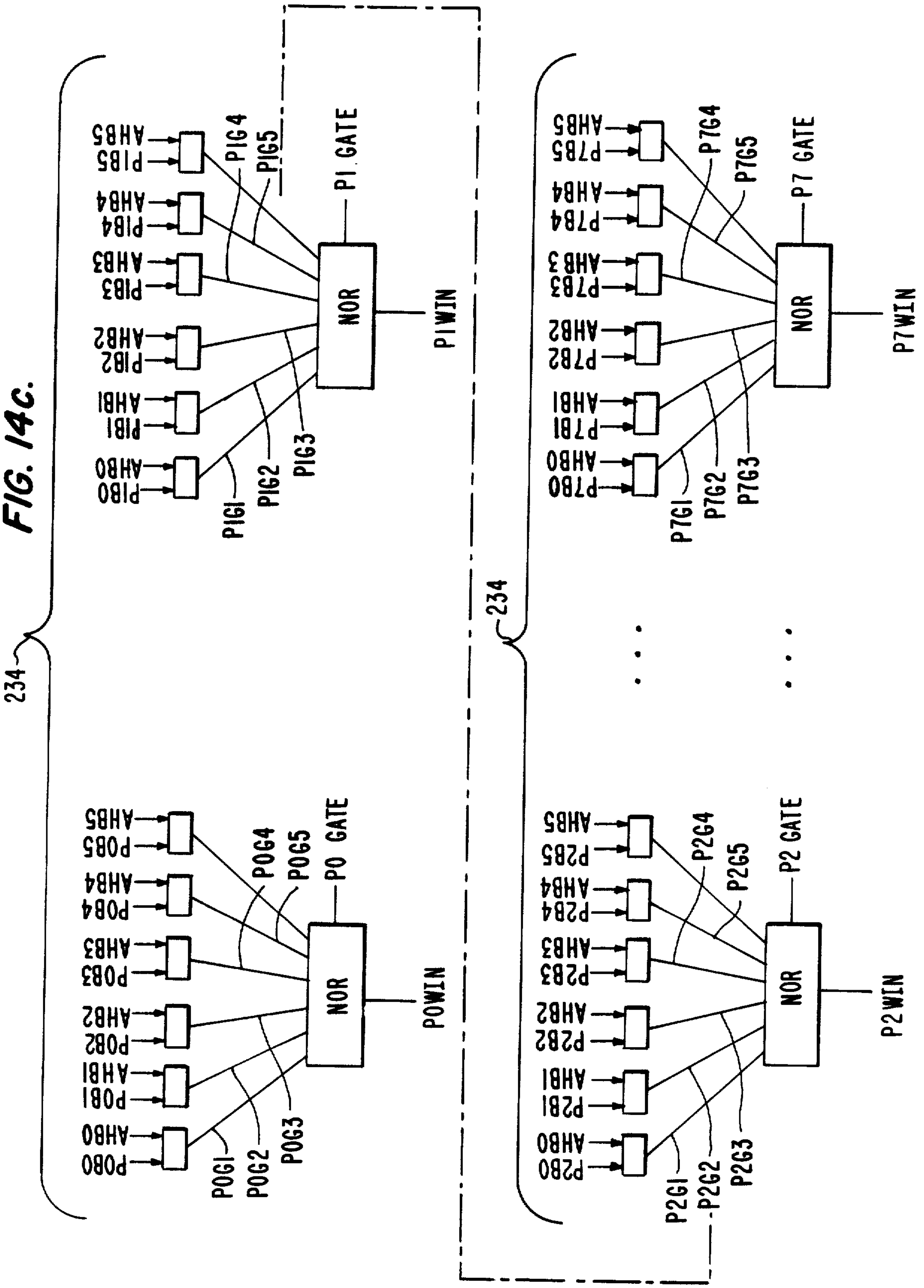

Referring to FIG. 13, the contend logic circuit 220, which is a part of the channel schedule circuit 24, determines which of the processors channels P0 through P7 will contend during the next instruction cycle for the even partition, the odd partition or servicing by the block move controller 30. The channel schedule circuit 24 includes a total of eight contend logic circuits (one shown) which are associated with the eight processor channels P0 through P7 and which are electrically similar to circuit 220 shown for processor channel P0. During phases zero and one of the instruction cycle, the instruction decode circuit 26 may generate an even release warning (ERW) signal and an odd release warning (OEW) signal. These warning signals indicate that the processor channels operating on the even and the odd partition will either execute a BLOCK instruction or a STOP instruction during the present instruction cycle. Thus, these processor channels will not recontend for the even and the odd partitions in the next instruction cycle.

The contend logic circuit 220 also has as inputs the discrete signal (EED0), (OED0) which indicate whether the processor channel P0 is presently operating on the even or the odd partitions, respectively. If processor channel P0 is presently operating on the even partition or the odd partition and the even release warning signal or odd release warning signal, respectively, has been generated, logic circuit 222 generates a low-level signal which indicates that the processor channel P0 will neither contend for the even partition nor the odd partition during the next instruction cycle. The low-level signal generated by logic circuit 222 is fed to NOR gates 224 through 228 to inhibit the generation of a contend signal. The status signals (S0, S1) of processor channel P0, phase signals K0 and K1, the even execution discrete signal associated with processor channel P0, the odd execution discrete signal associated with processor channel P0 and a P0 win even contention signal are also fed to selected ones of the NOR gates 224 through 228. A high-level signal is generated on the output of: (1) NOR gate 224 when P0 is operating on the even partition and recontends for the even partition, (2) NOR gate 225 when the processor channel P0 is in the NOT EXECUTING state and P0 will contend for the even partition, (3) NOR gate 226 when P0 is operating on the odd partition and recontends for the odd partition, (4) NOR gate 227 if P0 lost the contention for the even partition and contends for the odd partition, and (5) NOR gate 228 if the processor channel P0 is in NOT EXECUTING state and P0 contends for the odd partition unless it won the even partition. NOR gate 223 generates a high-level output signal if processor channel P0 is contending for a block transfer. The output signals from NOR gates 223 through 228 are fed to inputs of a NOR gate 229 which generates a contend signal P0GATE which is low level signal if processor channel P0 will contend or a high-level signal if processor channel P0 will not contend. Circuits, which are similar to logic circuit 220, generate contend signals P1GATE through P7GATE.

Channel Schedule Circuit 24

Referring to FIGS. 14*a* through 14*d*, the channel schedule circuit 24 receives inputs from the dispatcher 14 and the contend logic circuit 220. Priority signals, which are associated with the tasks assigned to the processor channels P0 through P7 are loaded into registers 230*a* through 230*h* (FIG. 14*a*), respectively, when the processor channels P0 through P7 are dispatched. The priority signals and contend signals (P0GATE through P7GATE) generated by the contend logic circuit 220 are fed to inputs of a NOR logic circuit 232 which generates outputs AHB0 through AHB5. Low level signals appearing on the outputs of the NOR logic circuit 232 indicate that one or more of the contending processor channels P0 through P7 has the respective bit 0 through 5 in a high state. For example, a low-level signal appearing on output AHB0 indicates that one of the processor channels P0 through P7 has bit zero in a high state. A first level of logic included in the NOR logic circuit 232 is used to mask out the processor channels P0 through P7 which will not contend for the next instruction cycle. A second level of logic in the NOR logic circuit 232, which is responsive to the first level, determines if one or more of the contending processor channels has the respective bit in the high state.

Outputs AHB0 through AHB5 of the NOR logic circuit 232 are fed to input of a NOR logic circuit 234 (FIG. 14c) along with the priority bits associated with each of the respective processor channels P0 through P7. A first level of logic included in the NOR logic circuit 234 generates outputs which are fed to selected inputs of the NOR logic circuit 232. Thus, the NOR logic circuit 234 facilitates the comparison of the priority bits associated with the processor channels P0 through P7 in the order of bit zero through bit five. High-level signals occurring on outputs P0WIN through P7WIN of the NOR logic current 234 indicate that the respective processor channels has won the contention for partition.

Outputs P0WIN through P7WIN are fed into an encoder circuit 236 (FIG. 14d) in order to generate a 3-bit binary code which represents the winning processor channel. It is conceivable that more than one processor channels could have the same priority. In that case, the encoder circuit 236 is designed to be biased toward the processor channel have the lowest numeral designation, for example, processor channel P0 would win if it has the same priority as processor channel P3. Outputs P0WIN through P7WIN are also fed to inputs of a NOR gate 238 which generates a low-level signal if one of the processor channels P0 through P7 has won the contention or generates a high-level output signal if none of the processor channels are contending. The binary output from encoder 236 and the output signals generated by NOR gate 238 are stored in registers 204, 242 and 244 under the control of the gated-clocks signals C3, C5 and C7, respectively. As noted above, the channel schedule circuit 24 also determines which of the processor channels P0 through P7 in the BLOCK state has the highest priority. The binary code for the winning processor channel in the BLOCK state is stored in registered 240 at the end of phase 3 of the instruction cycle. At the end of phase 5 of the instruction cycle, the binary code appearing on the output of the encoder 236 represents the winner of the even partition and is stored in register 242. The output of register 242 if fed to a decode circuit 246 which generates 1-of-8 win even contention output signals WEC0 through WEC7. The win even contention signals are fed to the contend logic circuit 222 (FIG. 13) which eliminates the winner of the even partition from the contention for the odd partition. The binary code representing winner of the even partition is also stored in register 248 at the end of phase 6 of the instruction cycle.

If there are any remaining processor channels which are contending for the odd partition, a binary code representing the winner thereof appears on the output of the encoder 236 and is stored in register 244 at the end of phase 7 of the instruction cycle. The binary codes stored in registers 244 and 248, hereinafter the odd channel select signals and the even channel select signals, respectively, are fed to decode circuits 250 and 252 which generates 8-bit odd execution discrete signals and even execution discrete signals, respectively. The even and the odd execution discrete signals are also fed to inputs of logic circuits 222 of the contend logic circuit 220 (FIG. 13). The even channel select signals and the odd channel select signals are also fed to inputs of a multlplexer 254 which selectively transmits the select signals to register 256 under control of the phase clock K2. The select signals are stored in register 256 and register 258 under control of system clock C as multiplexer control signals MCS, MCS1, and MCS2.

Conclusion

The MSRP 16 enables the rapid transfer of execution between unrelated application programs in a multi-tasking environment by utilizing a memory intensive design which concurrently supports eight instruction streams. Each one of the instruction streams is executing on one of eight processor channels P0 through P7 which share the same instruction store, cache memory, working registers and CPU 20. The cache memory and working registers are segmented to be processor channel exclusive in order to prevent inter-channel interference. A dispatcher 14 monitors the status of each of the processor channels P0 through P7 and distributes prioritized tasks to the idle processor channels. Once a task is dispatched, the assigned processor channel contends for one of two unique instructions partitions which are available in an instruction cycle until the task is completed. Two unique processor channels, working on unrelated task, utilize the even and the odd partition in order to execute their respective instructions. The eight phases of instruction cycle facilitate the sharing of the memory system 18 and CPU 20 by the two partitions. When one of the partitions is accessing the cache memory and the working registers, the other partition is accessing the CPU 20. Moreover, a single instruction executes in one partition of the multi phase of the instruction cycle to build a cache address, perform a logical or arithmetical function and write information to the cache memory. The processor channels P0 through P7 read data from their segmented and common sections of cache memory during the initial phases of the instruction cycle and stores data in their segmented sections of cache memory during the latter phases of the instruction cycle. This permits for the immediate context switch to a task running on another one of the processor channels P0 through P7 at the conclusion of the multiphase instruction cycle.

Although a specified embodiment of the invention has been disclosed, it will be understood by those of skill in the art that the foregoing and other changes in form and details may be made therein without departing from the spirit and the scope of the invention.

What is claimed is:

1. A multi-channel shared resource processor coupled to an external dispatcher system which distributes a plurality of prioritized, independent tasks to a plurality of processor channels in the processor, said multichannel shared resource processor comprising:

a central processor unit;

means coupled to said central processor for selecting which of the plurality of processor channels will be serviced on a prioritized basis by the central processor unit;

means coupled to said central processor for monitoring the status of the processor channels selected to be serviced by the selecting means;

means coupled to the selecting means and to said central processor unit, for decoding instructions to be processed by the selected processor channels to enable the operation of the central processor unit;

an external memory means;

means coupled to said selecting means and coupled between said central processor and said external memory means and responsive to the selecting means, for transferring blocks of data to and from the external memory means;

wherein the plurality of processor channels share a multiphase instruction execution cycle having an odd and an even partition and wherein the selecting means includes:

means for assigning the selected channels to an even partition and to an odd partition of the multiphase instruction cycle;

a first means for generating a plurality of phase and gated-clock signals; and a first means, responsive to the first generating means, for determining which of the processor channels will contend for the even partition and for the odd partition of a multiphase instruction cycle.

2. The multi-channel shared resource processor as recited in claim 1 wherein the processor channels operate in one of four states and wherein the monitoring means includes:

a second means for generating state signals which enable a change of the selected processor channels from a first state to a subsequent state; and a third means, responsive to the second generating means, for generating status signals which represent the current-state and the next-state of the selected processor channels.

3. The multi-channel shared resource processor as recited in claim 2 wherein the central processor unit includes:

a plurality of program counters, with one of the flag registers corresponding to said selected one of the plurality of processor channels;

a pair of random access memory circuits, with each of the memory circuits being segmented into working registers, the working registers corresponding to said selected one of the plurality processor channels; and an arithmetic logic unit for performing micro-programmed controlled operations;

said program counters enabling the accessing of the external memory means corresponding to the selected one of the processor channels and said flag registers enabling arithmetic operations of the arithmetic logic unit.

4. The multi-channel shared resource processor as recited in claim 1 wherein the selecting means further includes:

a first means for storing priority signals generated by the dispatcher system which are associated with tasks assigned to the plurality of the processor channels; and a second means for determining which of the processor channels has the highest priority.

5. The multi-channel shared resource processor as recited in claim 4 wherein the assigning means includes:

means, responsive to the second determining means, for encoding a binary representation of the processor channel having the highest priority; and a second means, responsive to the first generating means, for storing the binary representation;

said binary representation being stored under the control of a first gated-clock signal representing the processor channel to be serviced by the transferring means, said binary representation being stored under the control of a second gated-clock signal representing the processor channel to be assigned to the even partition and said binary representation being stored under the control of a third gated-clock signal representing the processor channel to be assigned to odd partition.

6. The multi-channel shared resource processor as recited in claim 5 wherein the first determining means includes means, responsive to the assigning means, for eliminating the processor channel assigned to the even partition from the contention for the odd partition.

* * * * *